(12) United States Patent
Ohzawa et al.

(10) Patent No.: US 7,301,578 B2
(45) Date of Patent: Nov. 27, 2007

(54) SUPER-WIDE-ANGLE OPTICAL SYSTEM AND IMAGE PICKUP DEVICE

(75) Inventors: Soh Ohzawa, Toyonaka (JP); Keiji Matsusaka, Osaka (JP)

(73) Assignee: Konica Minolta Opto, Inc., Hachioji-Shi (JP)

(*) Notice: Subject to any disclaimer, the term of this patent is extended or adjusted under 35 U.S.C. 154(b) by 707 days.

(21) Appl. No.: 10/864,727

(22) Filed: Jun. 9, 2004

(65) Prior Publication Data
US 2005/0174463 A1  Aug. 11, 2005

(30) Foreign Application Priority Data
Feb. 9, 2004  (JP) .............................. 2004-031694

(51) Int. Cl.
*G02B 13/04* (2006.01)
(52) U.S. Cl. ...................... 348/340; 359/753
(58) Field of Classification Search ................ 348/355, 348/340; 359/752, 753
See application file for complete search history.

(56) References Cited

U.S. PATENT DOCUMENTS 5,724,195 A * 3/1998 Enomoto et al. ........... 359/752
5,861,999 A * 1/1999 Tada ......................... 359/752

FOREIGN PATENT DOCUMENTS

JP        4-68307 A      3/1992
JP     2002-72085 A      3/2002

* cited by examiner

Primary Examiner—Ngoc-Yen Vu
Assistant Examiner—Christopher K Peterson
(74) Attorney, Agent, or Firm—Sidley Austin LLP

(57) ABSTRACT

A super-wide-angle optical system for forming an optical image of an object on an image pickup surface of an image sensing device that converts the optical image into an electrical signal is provided with, in order from the object side, a first negative lens, a second negative lens and a positive lens. The first negative lens has a meniscus shape convex to the object side. The second negative lens is positioned next to the first negative lens. The positive lens has an aspherical surface. At least one of four lens surfaces of the first and second lenses is an aspherical surface. A prescribed condition is fulfilled.

21 Claims, 10 Drawing Sheets

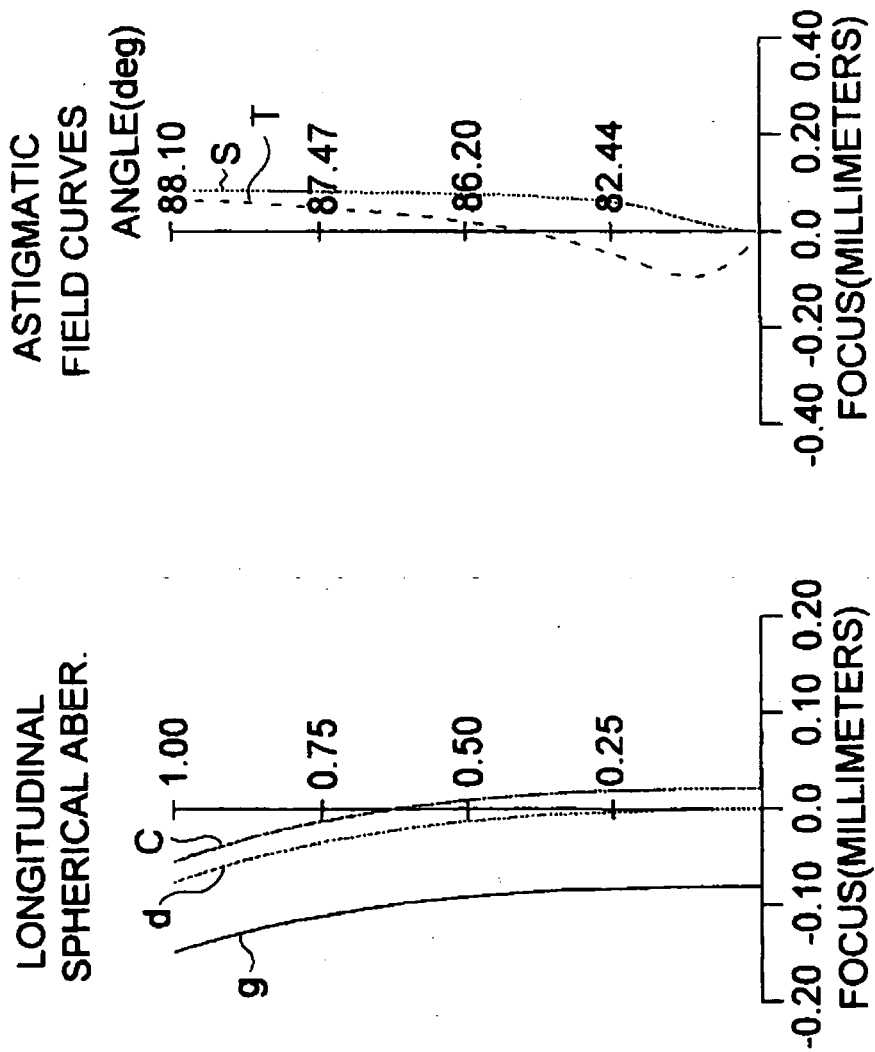

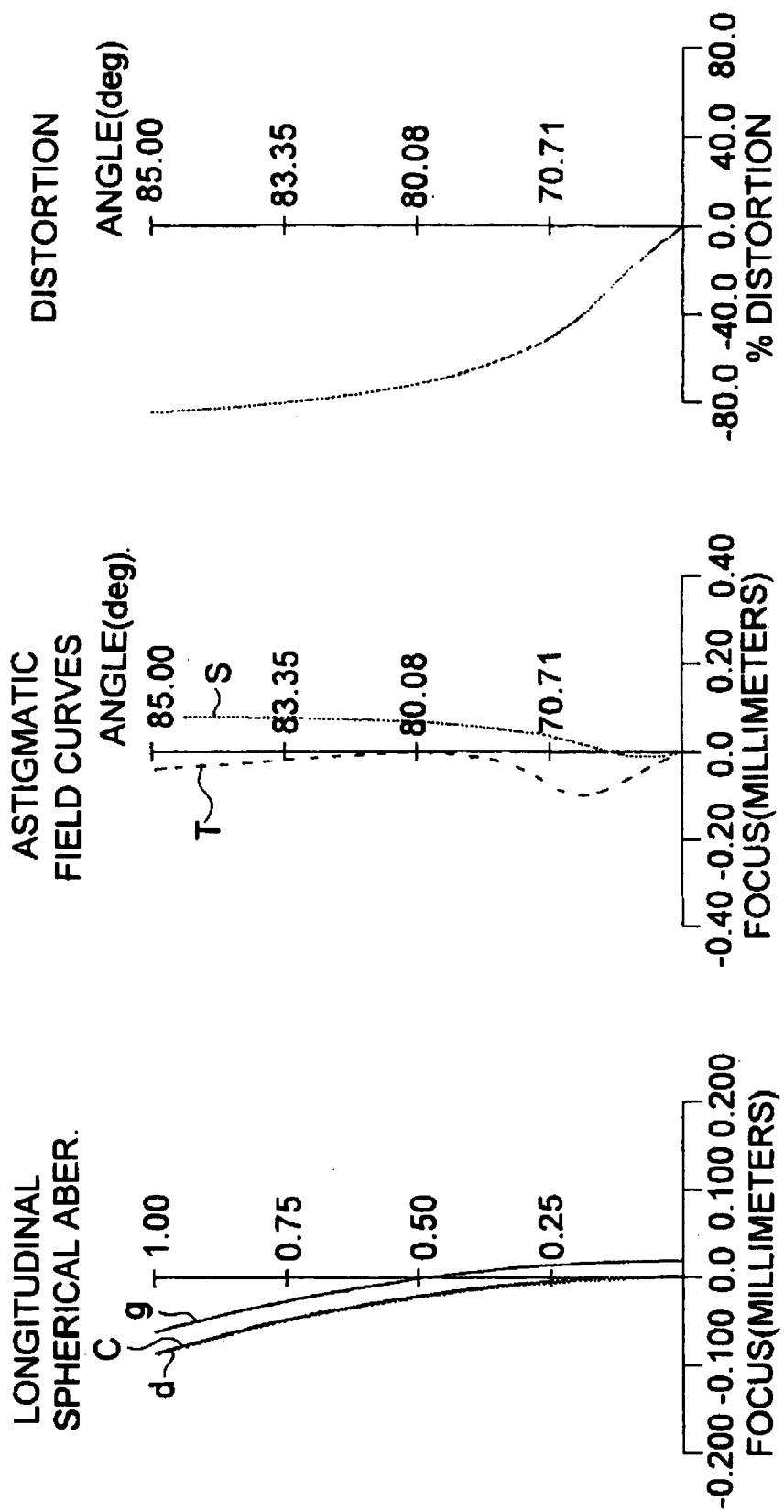

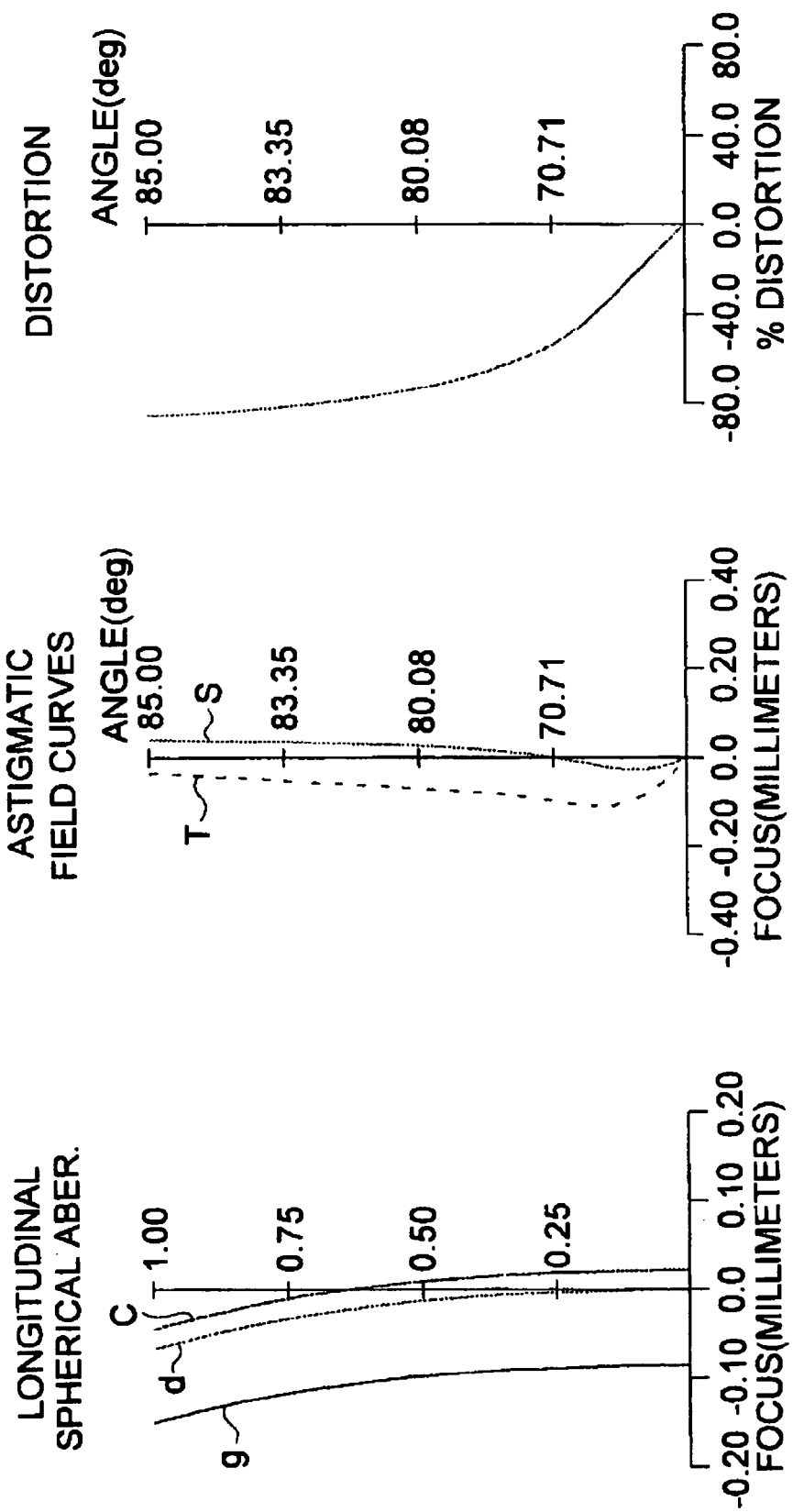

SUPER-WIDE-ANGLE OPTICAL SYSTEM AND IMAGE PICKUP DEVICE

This application is based on the application No. 2004-31694 filed in Japan, Feb. 9, 2004, the entire content of which is hereby incorporated by reference.

BACKGROUND OF THE INVENTION

1. Field of the Invention

The present invention relates to a super-wide-angle optical system. For example, the invention relates to the compact super-wide-angle optical system having super wide field angle which is suitable for an image input device used as a monitor camera and an in-vehicle camera. Further, the invention relates to an image pickup device using the super-wide-angle optical system.

2. Description of the Related Art

Since it is necessary for monitor application or the like to pick up ambient image information using small number of image pickup systems extensively, a super-wide-angle optical system for picks up an image of an object at a super wide angle. As such super-wide-angle optical systems, various types of them are conventionally suggested. For example, Japanese Patent No. 2992547 (Japanese Patent Application Laid-Open No. H04-68307) suggests a super-wide-angle lens system composed of only six spherical lenses. Japanese Patent Application Laid-Open No. 2002-72085 suggests a super-wide-angle lens system composed of six lenses including one glass aspherical lens.

In order to attain a super wide angle using only spherical lenses, generally about eight lenses are necessary. When the number of lenses is decreased, various problems arise. For example as described in Japanese Patent No. 2992547, when the number of lenses is decreased, an entire length and a diameter of the lens become large, downsizing or sufficient definition become difficult. Further, as described in Japanese Patent Application Laid-Open No. 2002-72085, when the number of lenses is decreased, a diameter of the lenses (particularly, a diameter of a first lens) becomes large, and also the production cost increases due to the use of aspherical glass lenses.

SUMMARY OF THE INVENTION

It is an object of the present invention to provide an optical system which solves the above problems. Another object of the invention is to provide an inexpensive and compact super-wide-angle optical system having satisfactory optical performance and a wide field angle, an image pickup lens device and a monitor device using the optical system.

In order to achieve the above objects, one aspect of the present invention is a super-wide-angle optical system, for forming an optical image of an object on an image pickup surface of an image sensing device, and includes a first negative lens having a meniscus shape convex to an object side and a second negative lens in this order from the object side. In the super-wide-angle optical system, at least one of four lens surfaces of the first and second lenses is composed of an aspherical surface, at least one positive lens is provided on an image side with respect to the first and second lenses, and one of the positive lenses has an aspherical surface. The optical system satisfies the following conditional expression:

$$0.05 < (TL \times Yd)/\{f \times \tan(\Psi d)\} < 3.5$$

where, $\Psi d$ represents maximum half field angle,

Yd represents maximum image height (mm),

TL represents on-axis length (mm) from the lens surface in the closest position to the object and an imaging position, and f represents focal length (mm) of the entire optical system.

According to another aspect of the present invention, an image pickup device is provide with: a super-wide-angle optical system as described above; and an image sensing device for converting the optical image of the object into an electrical data

BRIEF DESCRIPTION OF THE DRAWINGS

These and other objects, advantages and features of the invention will become apparent from the following description thereof taken in conjunction with the preferred embodiments with the reference to the accompanying drawings in which:

FIGS. 8A to 8C are aberration diagrams according to the second embodiment;

FIGS. 9A to 9C are aberration diagrams according to the third embodiment;

FIGS. 12A to 12C are aberration diagrams according to the sixth embodiment.

DETAILED DESCRIPTION OF THE PREFERRED EMBODIMENTS

Figure 1:
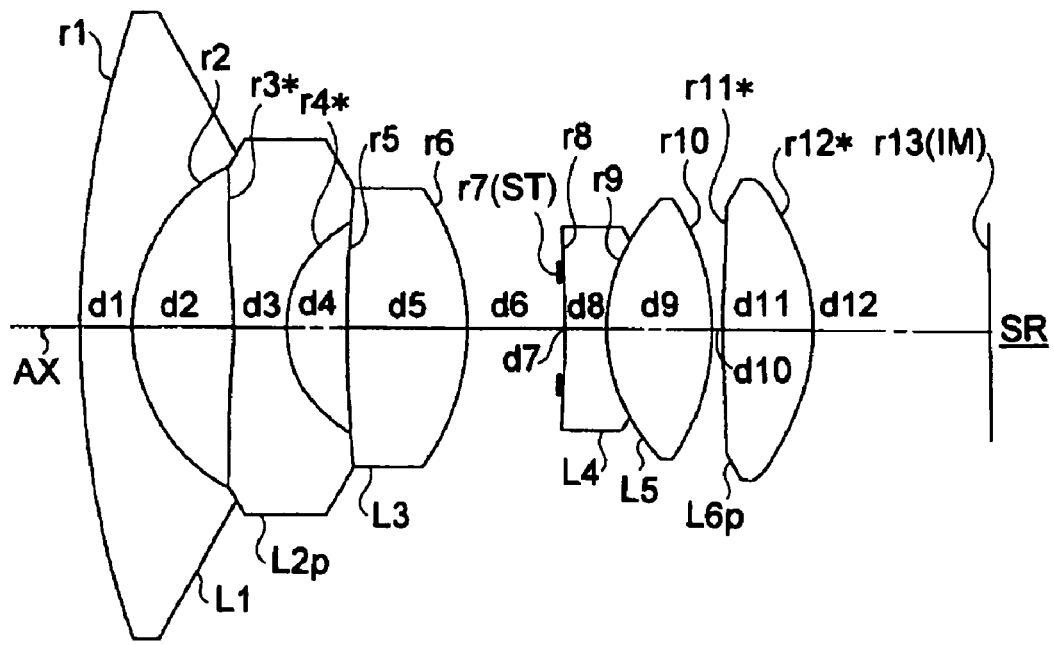
FIG. 1 is a diagram illustrating a lens constitution according to a first embodiment.
Figure 2:
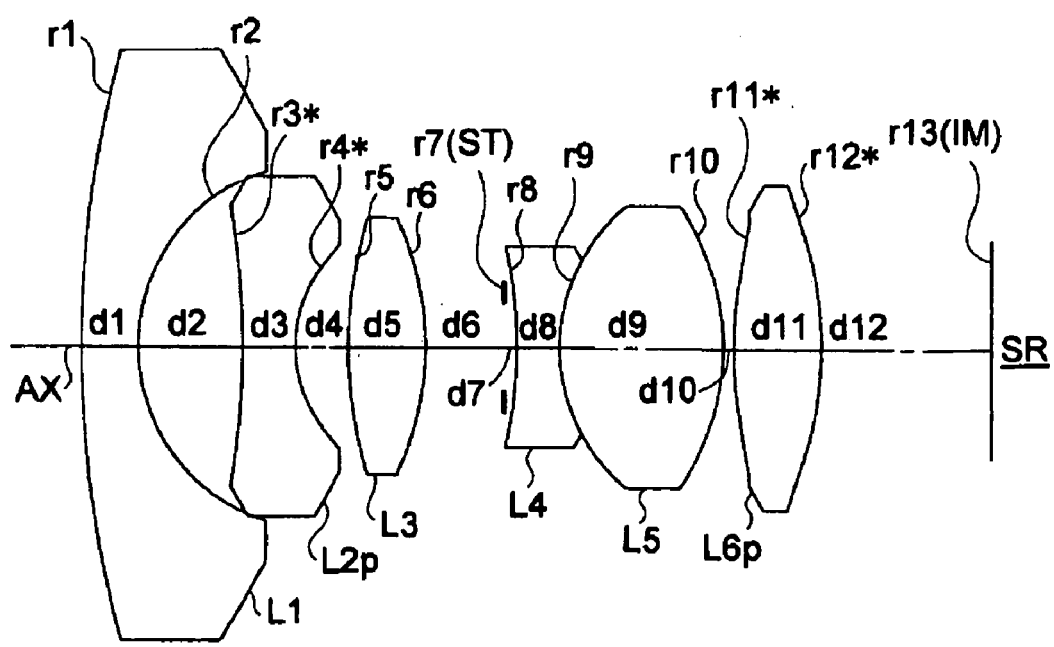
FIG. 2 is a diagram illustrating a lens constitution according to a second embodiment.
Figure 3:
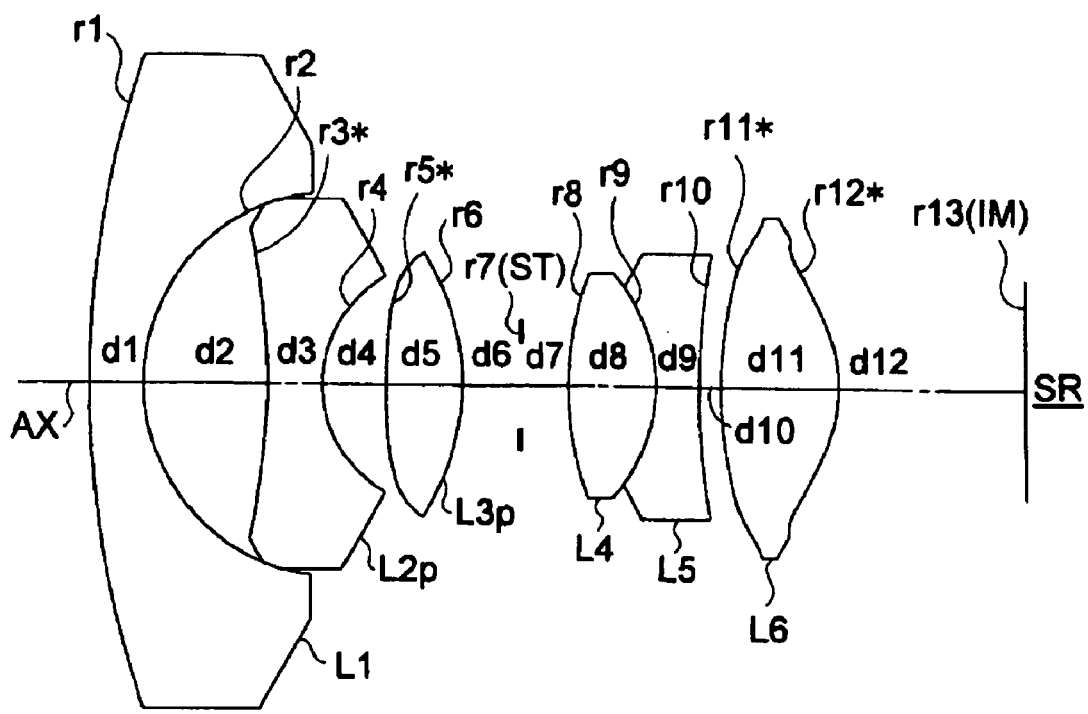
FIG. 3 is a diagram illustrating a lens constitution according to a third embodiment.
Figure 4:
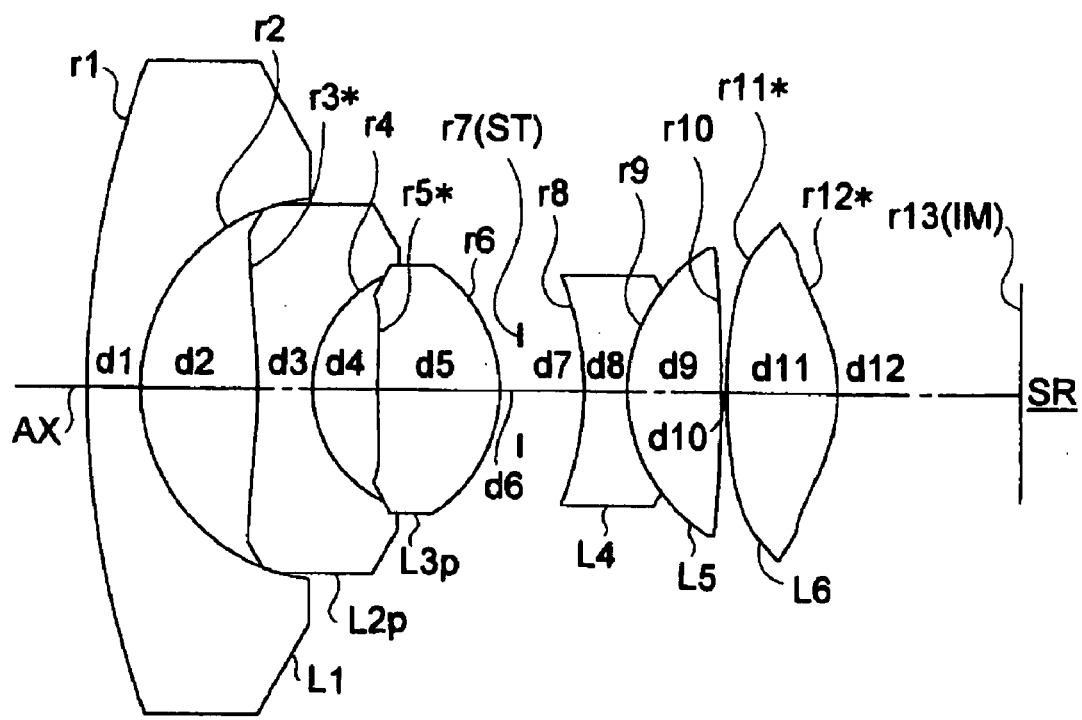
FIG. 4 is a diagram illustrating a lens constitution according to a fourth embodiment.
Figure 5:
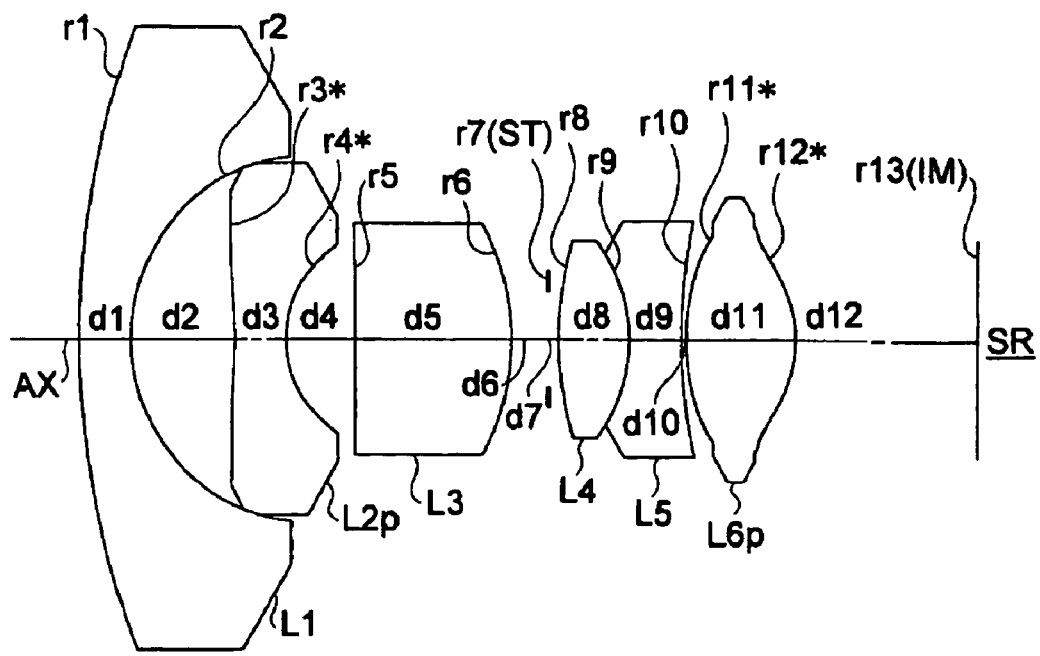
FIG. 5 is a diagram illustrating a lens constitution according to a fifth embodiment.
Figure 6:
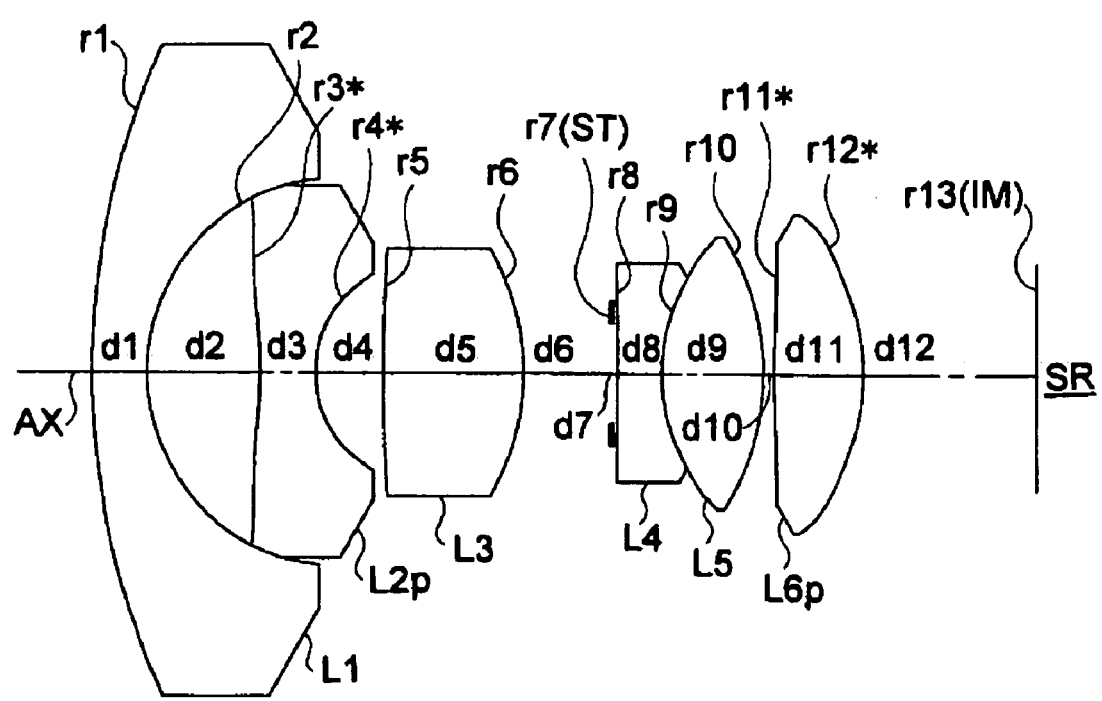
FIG. 6 is a diagram illustrating a lens constitution according to a sixth embodiment.
Figures 7A, 7B, 7C:
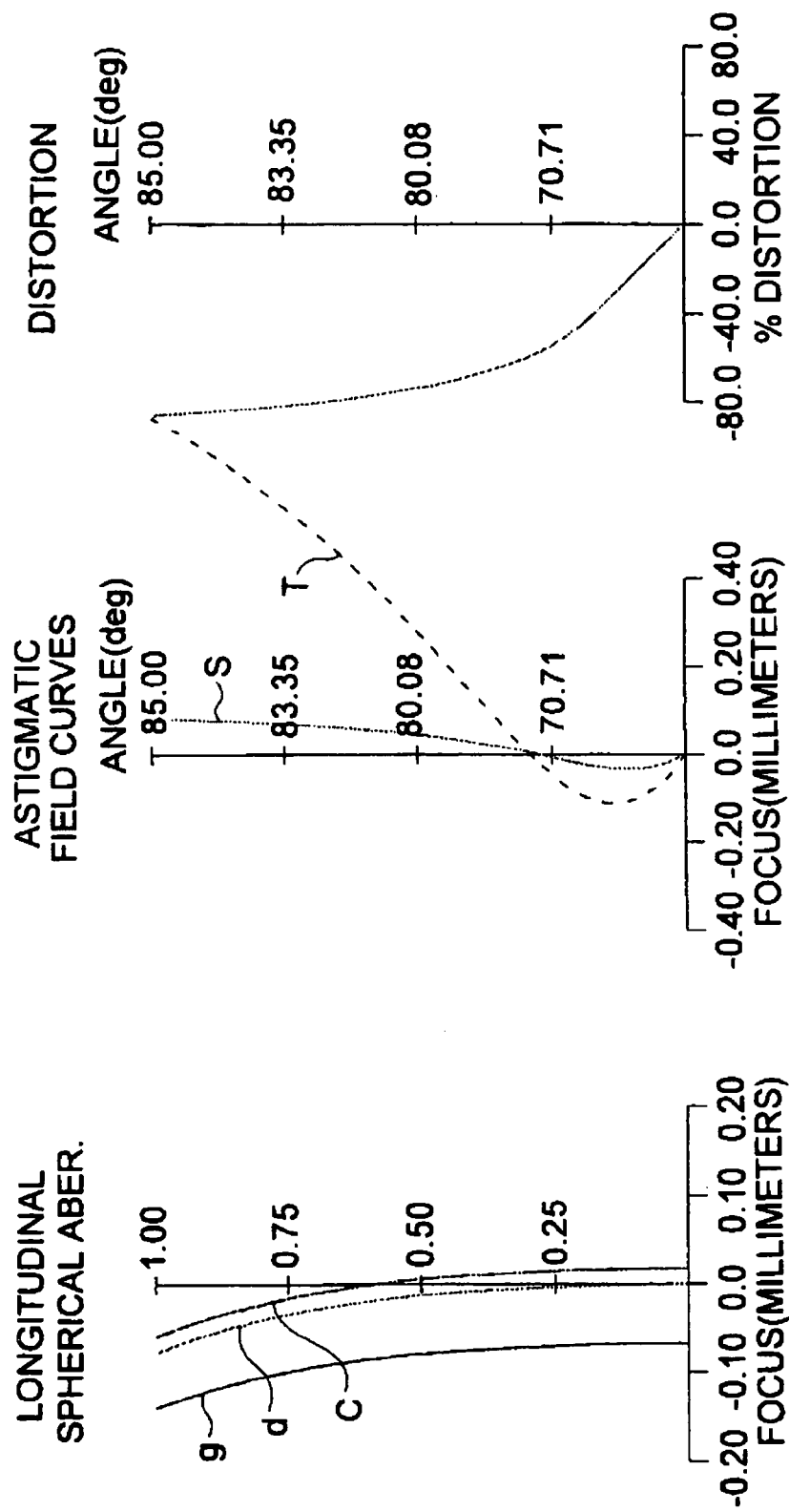
FIGS. 7A to 7C are aberration diagrams according to the first embodiment.
Figures 10A, 10B, 10C:
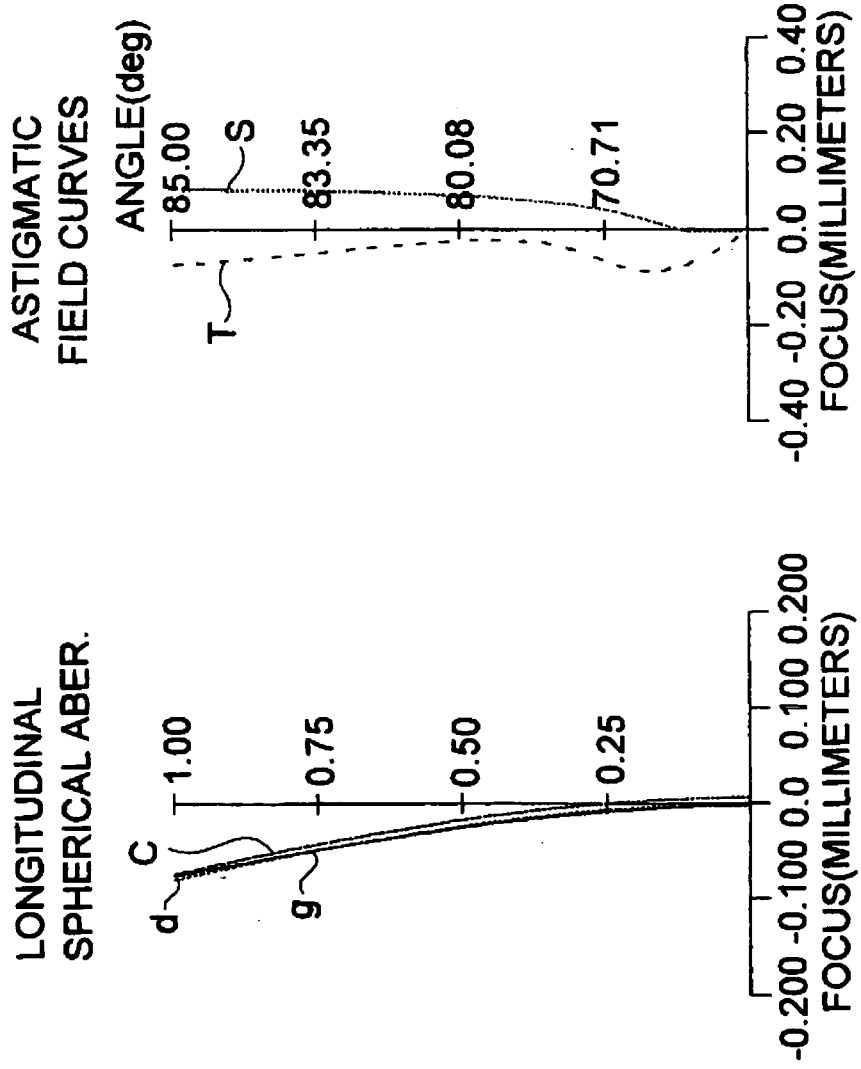
FIGS. 10A to 10C are aberration diagrams according to the fourth embodiment.
Figures 11A, 11B, 11C:
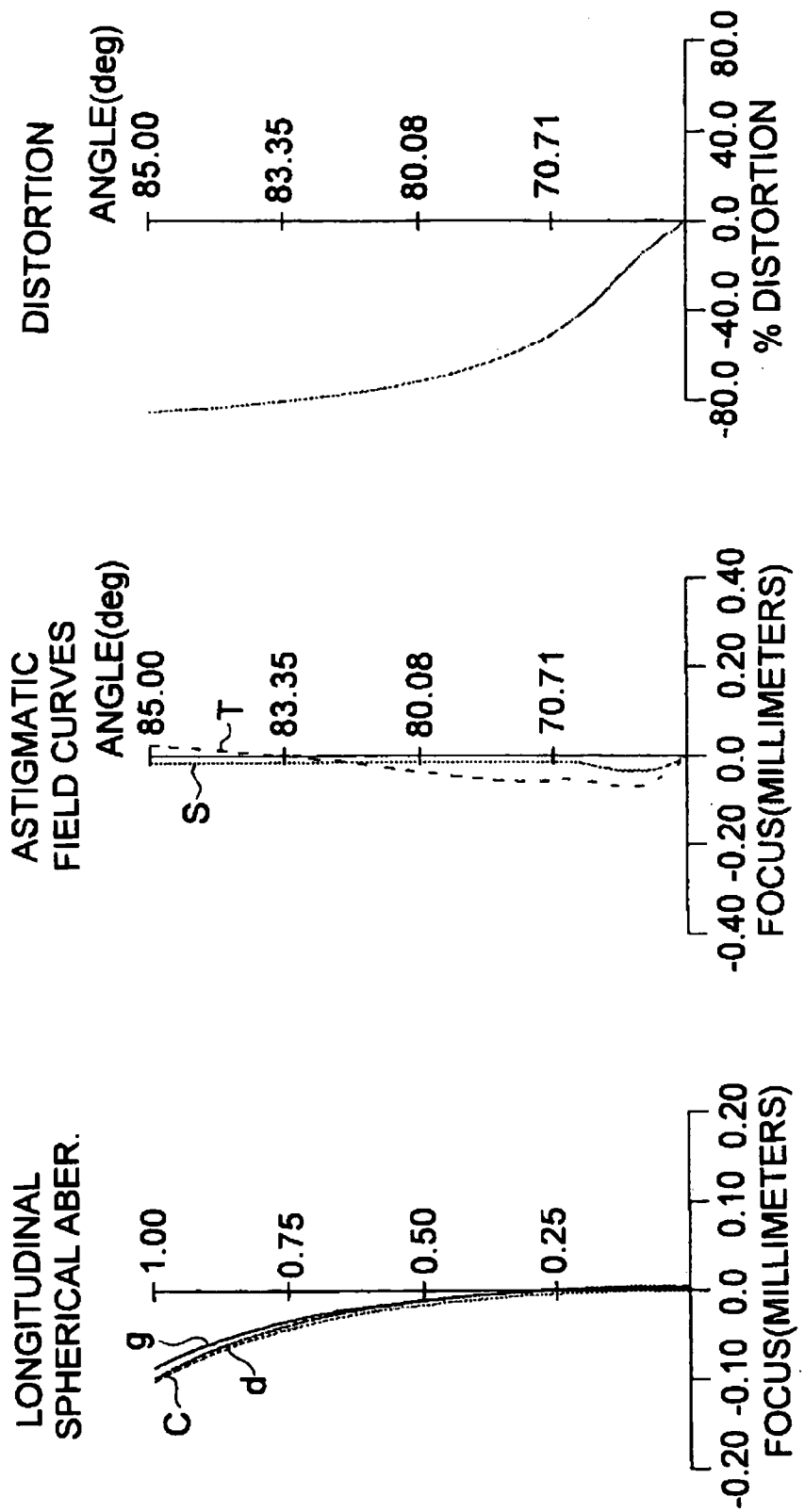
FIGS. 11A to 11C are aberration diagrams according to the fifth embodiment.

A super-wide-angle optical system according to embodiments of the present invention will be explained below with reference to the drawings. FIGS. 1 to 6 are optical cross sectional views illustrating a lens constitution according to first to sixth embodiments. Each super-wide-angle optical system according to the respective embodiments is a super-wide-angle single focal lens system for forming an optical image (IM: image surface) of an object on an image pickup surface of an image sensor {for example, a solid-state image sensing device such as a CCD (charge coupled device)} SR. In the lens constitutional diagrams (FIGS. 1 to 6), surfaces designated by ri (i=1, 2, 3, . . . ) are ith surfaces counted from an object side (a surface designated by ri* is an aspherical surface). Axial distances designated by di (i=1, 2, 3, . . . ) are ith intervals of the on-axis surfaces counted from the object side. Further, the lenses designated by Lj (j=1, 2, 3, . . . ) are jth lenses counted from the object side, and the jth lenses designated by Ljp are plastic lenses. The super-wide-angle optical system means a wide-angle optical system having a half field angle of 75° or more.

The lens constitutions in the respective embodiments are detailed below. Each of the super-wide-angle optical systems in the respective embodiments has a six-lens constitution composed of a first lens L1 to a sixth lens L6. Two of the lenses are plastic lenses, and four of them are glass lenses. Further, an aperture diaphragm ST is provided between the third lens L3 and the fourth lens L4, and a cemented lens composed of the fourth lens L4 and the fifth lens L5 is arranged on the image surface IM side of the aperture diaphragm ST.

In the first, the second and the sixth embodiments (FIGS. 1, 2, and 6), the first lens L1 is a negative meniscus lens whose object side is convex, the second lens L2 is a negative plastic aspherical lens having a deep concave surface on its image side, the third lens L3 is a biconvex positive lens, the fourth and fifth lenses L4 and L5 are negative and positive cemented lenses, and the sixth lens L6 is a biconvex positive plastic aspherical lens. In the fifth embodiment (FIG. 5), the first lens L1 is a negative meniscus lens whose object side is convex, the second lens L2 is a negative plastic aspherical lens in which a deeply concave surface is arranged on its image side, the third lens L3 is a positive meniscus lens whose image side is convex, the fourth and fifth lenses L4 and L5 are positive and negative cemented lenses, and the sixth lens L6 is a biconvex positive plastic aspherical lens.

In the third embodiment (FIG. 3), the first lens L1 is a negative meniscus lens whose object side is convex, the second lens L2 is a negative plastic aspherical lens in which a deep concave surface is arranged on the image side, the third lens L3 is a positive plastic aspherical lens, the fourth and fifth lenses L4 and L5 are positive and negative cemented lenses, and the sixth lens L6 is a biconvex positive aspherical lens. In the fourth embodiment (FIG. 4), the first lens L1 is a negative meniscus lens whose object side is convex, the second lens L2 is a negative plastic aspherical lens in which a deep concave surface is provided on its image side, the third lens L3 is a positive plastic aspherical lens, the fourth and fifth lenses L4 and L5 are negative and positive cemented lenses, and the sixth lens L6 is a biconvex positive aspherical lens.

In the above embodiments, the super-wide-angle optical system includes the first negative lens L1 having a convex meniscus shape on its object side, the second negative lens L2 in this order from the object side. At least one of the four lens surfaces of the first and second lenses L1 and L2 is composed of an aspherical surface, and at least one positive lens is provided on the image side with respect to the first and second lenses L1 and L2. One of the positive lenses has an aspherical surface. In such a manner, when the negative meniscus lens convex to the object side is used as the first lens, the convex surface which faces the object side enables off-axis light whose half field angle is nearly 90° to enter the optical system. Its negative power (a quantity defined by an inverse number of a focal length) enables the off-axis light beams which enter the optical system at a large angle to direct towards an image surface direction. Further, when a power arrangement of retrofocus such that the first and second lenses positioned on the closest side to the object have a negative power is adopted, sufficient lens back can be obtained even with a short focal length necessary for a super wide angle. Since the incident angle of the light beams with respect to the image surface can be set to be nearly vertical, the constitution which is suitable for an electron image sensor such as CCD can be obtained.

The suitable aspherical surface arrangement as explained in the embodiments is adopted, so that while a reduction in the cost is being attempted by a reduction in the number of the lenses, a satisfactory optical performance can be obtained as the image pickup optical system for the image sensor. That is to say, since the first and second lenses having the negative power greatly separate luminous flux of different image heights, at least one of the four lens surfaces is composed of an aspherical surface, so that a curvature of field can be easily corrected and distortion can be easily controlled. When the aspherical surface is arranged on the second lens, a diameter of the aspherical lens can be reduced further than the case where the first lens has the aspherical surface. For this reason, the high accurate aspherical surface can be obtained, and its manufacturing becomes easy. Moreover, since the aspherical surface can be arranged on a position through which the off-axis light is separated and passes, the curvature of field can be suppressed even at a super wide angle. On the other hand, when the aspherical surface is provided to the positive lens arranged on the image surface side with respect to the two negative lenses (namely, the first and second lenses), spherical aberration and coma aberration can be improved.

In the embodiments, the arrangements of the suitable optical power and the aspherical surface realize the satisfactory optical performance and the wide field angle of the image pickup optical system for the image sensor and simultaneously achieve the compact constitution and the low cost. When the super-wide-angle optical system of the embodiments is used as the image pickup optical system for image input equipments such as a monitor camera and an in-vehicle camera, the super wide field angle, the high performance, high function, the low cost and the downsizing of the image input equipments can be achieved. Conditions for obtaining such effects in a balanced manner and achieving higher optical performance are explained below.

It is desirable that an entire lens length of the super-wide-angle optical system and a balance of the field angle or the like satisfy the following conditional expression (1):

$$0.05 < (TL \times Yd)/\{f \times \tan(\Psi d)\} < 3.5 \quad (1)$$

wherein, $\Psi d$ represents maximum half field angle,

Yd represents maximum image height (mm),

TL represents on-axis length (mm) from a lens surface closest to the object to an image forming position, and f represents focal length (mm) of the entire system.

When the condition is smaller than a lower limit of the conditional expression (1), the lens entire length becomes too small, or the incident angle of the light beams from the object becomes too large. For this reason, the off-axis performance is difficultly secured. On the contrary, when the condition exceeds an upper limit of the conditional expression (1), the lens entire length becomes too large, and the system is not compact.

It is desirable that the following conditional expression (1a) is satisfied:

$$0.1 < (TL \times Yd)/\{f \times \tan(\Psi d)\} < 3.0 \quad (1a)$$

The conditional expression (1a) defines a more preferable condition range based on the above view points or the like in the condition range defined by the conditional expression (1).

The negative optical power of the first and second lenses arranged on the object side desirably satisfies the following conditional expression (2), and more desirably satisfies the conditional expression (1) or (1a) also.

$$-1.55 < f12/f < -0.7 \quad (2)$$

wherein,
    f: represents focal length of the entire system, and
    f12 represents composite focal length of the first lens and the second lens.

The conditional expression (2) defines the preferable condition range in relation to the composite focal length of the two negative lenses arranged on the object side. When the negative optical power is smaller than a lower limit of the conditional expression (2), the negative power becomes too weak, it is difficult to greatly curve the light beams with large incident angle, so that the achievement of the super wide angle becomes difficult. On the contrary, the negative optical power exceeds an upper limit of the conditional expression (2), the negative power becomes strong and curvature of the surfaces of the negative lenses becomes too large, so that the manufacturing is difficult.

It is more desirable that the negative optical power satisfies the following conditional expression (2a):

$$-1.3 < f12/f < -0.9 \quad (2a)$$

When the negative optical power is smaller than a lower limit of the conditional expression (2a), the retrofocus becomes weak and a degree that the incident angle to the image surface shifts from perpendicular increases. For this reason, this case is not suitable for the electron image sensor such as CCD.

On the contrary, when the negative optical power is larger than an upper limit of the conditional expression (2a), it is difficult that the aspherical surface sufficiently corrects a curvature of field generated by the surface with large curvature. For this reason, this case cannot cope with definition of CCD or the like.

The first and second lenses having the aspherical surface, and the positive lens having the aspherical surface are made by molding a plastic material, and they desirably satisfy the following conditional expression (3):

$$-3.0 < fP/fM < -0.5 \quad (3)$$

wherein,
    fM represents focal length of the first or second lens having the aspherical surface, and
    fp represents focal length of the positive lens having the aspherical surface.

The use of the plastic lens is effective for achieving the light weight and the low cost of the optical system, and the use of the plastic aspherical lens is effective for improving the optical performance. When the plastic aspherical lens is used, however, a fluctuation in the back focus due to a temperature change becomes large, and thus it is difficult to maintain the performance in a wide temperature range. Since the use temperature range is wide particularly in monitoring and in-vehicle applications, a fluctuation in the image surface position due to thermal expansion or the like becomes a problem. The conditional expression (3) defines a preferable optical power ratio when a fluctuation in the performance due to the temperature change is suppressed in the case where both the negative aspherical lens and the positive aspherical lens are plastic lenses. When the optical power ratio is smaller than a lower limit of the conditional expression (3) or larger than an upper limit of the conditional expression (3), the optical power is off-balance between the positive plastic aspherical lens and the negative plastic aspherical lens. As a result, a fluctuation in the aberration of the curvature of field or the like at the time of the temperature change is excessive.

It is desirable that the optical power ratio satisfies the following conditional expression (3a):

$$-2.2 < fP/fM < -1.4 \quad (3a)$$

When the optical power ratio is smaller than a lower limit of the conditional expression (3a) or is larger than an upper limit of the conditional expression (3a), the optical power is off-balance between the positive plastic aspherical lens and the negative plastic aspherical lens. As a result, a fluctuation in the back at the time of the temperature change is excessive, and the performance is deteriorated at the time of a fixed focus (for example, in the case of not autofocus but pan focus).

It is desirable that the optical power balance of the first and second lenses arranged on the object side satisfies the following conditional expression (4):

$$0.9 < f1/f2 < -2.5 \quad (4)$$

wherein,
    f1 represents focal length of the first lens, and
    f2 represents focal length of the second lens.

The conditional expression (4) defines a preferable condition range in relation to the optical power ratio of the negative lens arranged on the closest side to the object and the negative lens arranged on the second position from the object side. When the power ratio is smaller than a lower limit of the conditional expression (4), the negative optical power of the first lens becomes strong and the curvature of the concave surface becomes too large. As a result, the manufacturing becomes difficult. On the contrary, when the power ratio is larger than an upper limit of the conditional expression (4), the negative power of the second lens becomes strong and the curvature of the concave surface becomes too large. As a result, the manufacturing becomes difficult.

It is more desirable that the optical power ratio satisfies the following conditional expression (4a):

$$1.2 < f1/f2 < 1.8 \quad (4a)$$

When the power ratio is smaller than a lower limit of the conditional expression (4a), the negative power of the first lens becomes strong, and thus the curvature of the concave surface becomes large. For this reason, it is difficult that the aspherical surface of the second lens corrects the curvature of field generated by the first lens. On the contrary, when the power ratio is larger than an upper limit of the conditional expression (4a), the negative power of the second lens becomes strong. As a result, it is difficult that the aspherical surface of the second lens corrects the curvature of field generated by the spherical surface of the second lens.

The first lens is desirably a glass lens. When the first lens is made of glass, the first lens which is exposed to the outside can be provided with sufficient hardness, waterproof and chemical resistance. The super-wide-angle optical system having the first glass lens is, therefore, suitable to the use for monitoring or the like in the outdoors.

It is desirable that the second negative lens from the object (namely, the second lens) is a biconcave lens. When the biconcave lens is used as the second lens, a principal point position of the second lens can be arranged on the object side. As a result, since the position of the negative optical power can be put on the object side with an influence on the entire length being reduced, the negative optical power of the second lens can be further reduced. The aberration can be easily corrected, and the lens diameter can be reduced. Further, in the case where the second negative lens from the object (namely, the second lens) is the biconcave lens, the second lens desirably has an aspherical surface. When the front surface of the second lens (namely, the object side surface) is a concave surface, the incident angle of the off-axis light to the front surface of the second lens becomes large, and aberration of the curvature of field is generated. The aspherical surface of the second lens enables the curvature of field to be easily corrected.

In the above embodiments, it is desirable that the lens which is the closest to the image surface has a positive power. With this constitution, the incident angle of the light beams to the image surface approaches the perpendicular, and thus the optical system can be fitted to the electron image sensor such as CCD. Further, it is desirable that the lens having positive power arranged on the closest side to the image surface is the aspherical lens. With this constitution, this aspherical surface as well as the aspherical surface of the second lens can be provided to the front and left of the diaphragm. As a result, the position of the incident light beams to the lenses shift on each surface, so that a degree of freedom of the aberration correction due to the aspherical surfaces increases and the image performance is improved.

It is desirable that the lens which is the closest to the image surface satisfies the following conditional expression (5):

$$Rf/Rr < -0.8 \quad (5)$$

wherein,

Rf represents radius of curvature (mm) of the object-side surface of the closest lens to the image side, and Rr represents radius of curvature (mm) of the image-side surface of the closest lens to the image side.

When the condition of this lens exceeds an upper limit of the conditional expression (5), image surface property of the off-axis light is deteriorated. With the constitution which satisfies the conditional expression (5), the curvature of field and astigmatism, particularly the astigmatism can be corrected satisfactorily.

It is desirable that the aspherical lens to be used in the super-wide-angle optical system is a both-surface aspherical lens. With this constitution, since the aspherical surface is provided to different positions through which the light beams pass, the freedom of the aberration correction increases. That is to say, an incident height of one light beam differs on the front surface and the rear surface of the both-side aspherical lens, and another light beam passes through a different position on any one of the front surface and the rear surface. For this reason, the freedom of the aberration correction increases. Further, since the number of the lenses including the aspherical surface can be reduced, the manufacturing becomes easy and the cost can be reduced.

The super-wide-angle optical system according to the respective embodiments uses a refraction lens for deflecting the incident light beams according to a refraction function (namely, the lens for deflecting the light beams on an interface between media having different refractive index). A usable lens is not, however, limited to this type of the lens. For example, a diffraction type lens for deflecting the incident light beams according to a diffraction function, a refraction/diffraction hybrid type lens for deflecting the incident light beams according to the combination of the diffraction function and the refraction function, a refractive index distribution type lens for deflecting the incident light beams according to refractive index distribution in a medium, or the like may be used. The refractive index distribution type lens in which the refractive index changes in a medium causes the rise in the cost of a complicated manufacturing method. For this reason, it is desirable to use a lens whose distribution of the refractive index is uniform.

Besides the aperture diaphragm, a light flux regulating plate or the like for cutting unnecessary light may be arranged if the need arises. Further, when a prism or the like (for example, a rectangular prism), a mirror or the like (for example, a plane mirror) or the like is arranged on an optical path, the optical path is bent at the front or the rear of the super-wide-angle optical system, or at the middle on the surface without an optical power (for example, a reflection surface, a diffraction surface). In such a manner, a bent optical system (an optical system for reflecting light flux so that an optical axis is bent by 90° or approximately 90°) may be constituted. The bent position may be set if the need arises, and digital equipments (digital camera or the like) which are mounted with the super-wide-angle optical system can be thinned or downsized apparently by suitably bending the optical path.

The super-wide-angle optical system according to the embodiments is suitable for the use in a small image pickup optical system for image input equipments such as a monitor camera and an in-vehicle camera or in a small image pickup optical system for digital equipments having an image input function (for example, a camera-equipped cellular phone). This super-wide-angle optical system is combined with the image sensor or the like, so that an image pickup lens device can be achieved. The image pickup lens device optically captures an image of a subject and outputs the image as an electrical signal. The image pickup lens device composes a main component of a camera to be used for obtaining a still image or a moving image of a subject. The image pickup lens device is composed of, for example, a super-wide-angle optical system 1 for forming an optical image of an object and an image sensor SR for converting the optical image formed by the super-wide-angle optical system into an electrical signal which are arranged in this order from the object (subject) side. An optical filter (an optical low-pass filter, infrared cut filter or the like) is arranged between the super-wide-angle optical system 1 and the image sensor SR if the need arises.

Examples of the camera are: a monitor camera: an in-vehicle camera; a videophone camera; a doorbell camera; a digital camera; a video camera; and cameras which are provide internally or externally to a personal computer, a mobile computer, a cellular phone, a personal digital assistant (PDA), their peripheral equipments (mouse, scanner, printer and the like), another digital equipments and the like. The use of the image pickup lens device can, therefore, compose the camera, and also the mounting of the image pickup lens device into various equipments can add the camera function. In the case where the super-wide-angle optical system according to the embodiments is used in cameras, it is preferable that distortion of an image is processed so as to be corrected.

As the image sensor SR, solid-state image sensing devices such as CCD composed of a plurality of pixels and a CMOS (Complementary Metal Oxide Semiconductor) sensor are used. An optical image formed by the super-wide-angle optical system is converted into an electrical signal by the solid-state image sensing device SR. An optical image which should be formed by the super-wide-angle optical system is allowed to pass through an optical low-pass filter having a predetermined cutoff frequency property determined by a pixel pitch of the solid-state image sensing device SR. As a result, a spatial frequency property is adjusted so that a so-called return noise generated at the time of the conversion into the electrical signal is minimized. The signal generated by the solid-state image sensing device SR is subject to a predetermined digital image process, an image compressing process or the like as the need arises. As a result, the signal is recorded as a digital image signal into a memory (a semiconductor memory, an optical disc or the like), or the signal is transmitted via a cable or is converted into an infrared signal so as to be transmitted to another equipment in some cases.

Figure 13:
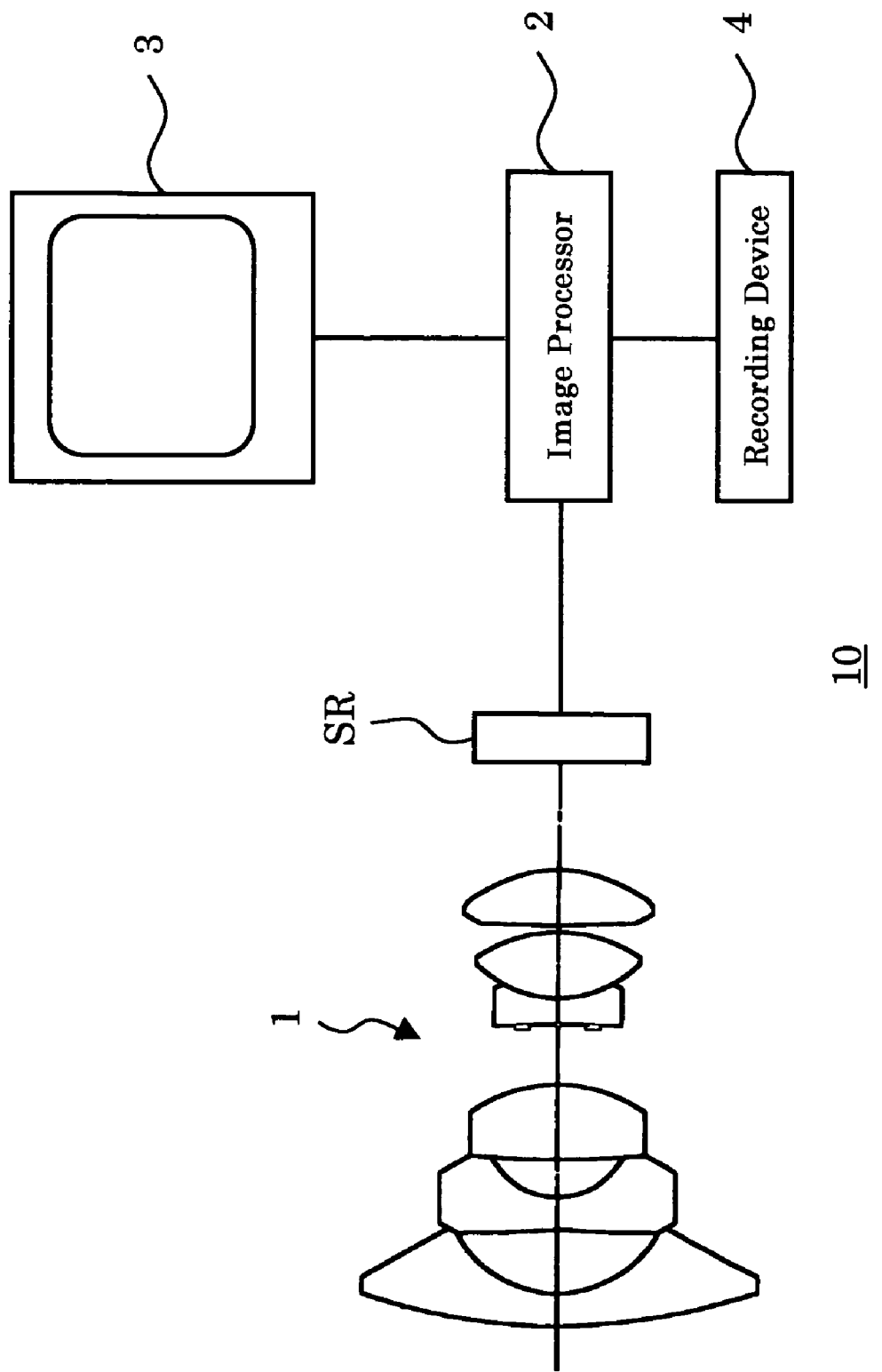
FIG. 13 is a constitutional diagram illustrating one example of a monitor device.

An example of a monitor device 10 using the super-wide-angle optical system 1 is shown in FIG. 13. An optical image of a subject formed by the super-wide-angle optical system 1 is converted into an electrical signal as image data by the image sensor SR. The image data are subject to data sampling, a predetermined analog image process, A/D conversion and a digital image process (for example, distortion correction, data compression) by an image processor 2. The image data which are subject to such processes are displayed on an image monitor display 3, and is checked as an image by a surveyor. In another method, the image data is recorded as still image data or moving image data by the recording device 4. Such a monitor device may be used as an in-vehicle monitor device. A plurality of cameras are mounted into a vehicle so as to be capable of monitoring a state outside the vehicle (for example, a position of another vehicles or another construct, or a position of walkers) and a state in the vehicle (for example, the state of riders and intruders).

As is understood from the above explanation, the above embodiments and an example, mentioned later, includes the following constitution. With this constitution, the compact image pickup lens device having a satisfactory optical performance and a wide field angle can be realized at the low cost. The application of the image pickup lens device into cameras, digital equipments or the like can contribute to a super wide field angle, high performance, high function, low cost and downsizing.

(U1) An image pickup lens device having a super-wide-angle optical system for forming an optical image and an image sensor for converting the optical image formed by the super-wide-angle optical system into an electrical signal, characterized in that the super-wide-angle optical system includes a first negative lens having a convex meniscus shape on an object side and a second negative lens in this order from the object side, at least one of the four lens surfaces of the first and second lenses is an aspherical surface, at least one positive lens is provided to an image side with respect to the first and second lenses, one of the positive lens(es) is an aspherical surface, and super-wide-angle optical system satisfies at least one of the conditional expressions (1), (1a), (2), (2a), (3), (3a), (4), (4a) and (5).

(U2) The image pickup lens device according to (U1), characterized in that the first and second lenses having an aspherical surface, and the positive lens having an aspherical surface are plastic lenses.

(U3) The image pickup lens device according to (U1) or (U2), characterized in that the second lens is a biconcave lens.

(U4) The image pickup lens device according to (U1), (U2) or (U3), characterized in that a lens in the closest position to a image surface is a both-side aspherical lens having a positive power.

(C1) A camera having the image pickup lens device according to (U1), (U2), (U3) or (U4), characterized in that the camera is used for obtaining one of a still image and a moving image of an object.

(C2) The camera according to (C1), characterized in that the camera is a monitor camera or an in-vehicle camera.

(D1) A digital equipment, characterized in that when the image pickup lens device according to (U1), (U2), (U3) or (U4) is provided, at least one of functions for obtaining a still image and a moving image of an object is added.

(D2) The digital equipment according to (D1), characterized in that the digital equipment is a personal computer, a mobile computer, a cellular phone, a personal digital assistant or their peripheral equipment.

EXAMPLES

The super-wide-angle optical system according to the present invention is more concretely explained by exemplifying construction data or the like. The examples 1 to 6 are numerical examples related with the first to sixth embodiments, and the lens constitutional diagrams showing the first to sixth embodiments (FIGS. 1 to 6) illustrate the lens constitutions according to the examples 1 to 6.

Tables 1 to 6 show the construction data of the first to the sixth examples, respectively. In the construction data of the examples, ri (i=1, 2, 3, . . . ) designates a radius of curvature (mm) of an ith surface counted from an object, and di (i=1, 2, 3, . . . ) designates the ith axial distance (mm) counted from the object. Ni (i=1, 2, . . . ) and vi (i=1, 2, . . . ) designate a refractive index (Nd) with respect to a line d of an ith optical element counted from the object, and an Abbe number (vd), respectively. Further, f designates a focal length (mm) of the entire system, $\Psi d$ designates a maximum half field angle (°), FNO designates an F number. Table 7 shows data corresponding to parameters defined by the respective conditional expressions and related data according to the respective examples.

The surface having radius of curvature ri with * is an aspherical surface (a refraction optical surface having an aspherical shape, a surface having a refraction function equivalent to that of the aspherical surface, or the like). This is designated by the following expression (AS) representing a shape of the aspherical surface. Aspherical data of the respective examples as well as another data are shown (however, undescribed coefficient is 0).

$$X(H)=(C0 \cdot H^2)/\{1+\sqrt{(1-\epsilon \cdot C0^2 \cdot H^2)}\}+\Sigma(Aj \cdot H^j) \quad (AS)$$

wherein,
X(H) represents displacement of height H to a direction of an optical axis AX (based on a surface peak),
H represents height in a vertical direction with respect to the optical axis AX,
C0 represents paraxial curvature (=1/ri),
$\epsilon$ represents quadric parameter, and
Aj represents jth-order aspherical coefficient.

FIGS. 7A to 7C, FIGS. 8A to 8C, FIGS. 9A to 9C, FIGS. 10A to 10C, FIGS. 11A to 11C, and FIGS. 12A to 12C are diagrams illustrating aberration of examples 1 to 6. In these drawings, FIGS. 7A, 8A, 9A, 10A, 11A, and 12A illustrate the spherical aberration and sine conditions. FIGS. 7B, 8B, 9B, 10B, 11B and 12B illustrate astigmatism. FIGS. 7C, 8C, 9C, 10C, 11C and 12C illustrate distortion aberration.

In the spherical aberration diagrams, an amount of the spherical aberration with respect to a line d (wavelength: 587.56 nm), an amount of the spherical aberration with respect to a line C (wavelength: 656.28 nm), and an amount of the spherical aberration with respect to a line g (wavelength: 435.84 nm) are represented by an amount of the shift from the paraxial image surface in the direction of the optical axis AX (lateral axis, unit: mm). The vertical axis represents a value obtained by standardizing a height of incidence to pupil by its maximum height (namely, relative pupil height). In the astigmatism diagrams, a broken line T represents a tangential image surface with respect to the line d and a solid line S represents a sagittal image surface with respect to the line d in a form of an amount of the shift from the paraxial image surface to the direction of the optical axis AX (lateral axis, unit: mm). The vertical axis represents a half field angle (ANGLE, unit: deg). In the distortion aberration diagrams (C), the lateral axis represents distortion (%) with respect to the line d, and the vertical axis represents a half field angle (ANGLE, unit: deg).

According to the embodiments, since the constitution has the suitable power arrangement and the suitable aspherical surface arrangement, the inexpensive and compact super-wide-angle optical system, which has satisfactory optical performance and a wide field angle as the image pickup optical system for image sensor, can be realized. When such a super-wide-angle optical system is used as the image pickup optical system for the image input equipments to be used as a monitor camera, an in-vehicle camera and the like, this can contribute to the super wide field angle, high performance, high function, low cost and downsizing.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

TABLE 1

<<Example 1>>
f = 1.5, Ψd = 85°, FNO = 2.5

| Radius of Curvature | Axial Distance | Refractive Index | Abbe Number |
|---|---|---|---|
| r1 = 17.002 | d1 = 1.000 | N1 = 1.77250 | ν1 = 49.62(L1) |
| r2 = 3.340 | d2 = 1.930 | | |
| r3* = −7.477 | d3 = 1.000 | N2 = 1.53048 | ν2 = 55.72(L2) |
| r4* = 2.500 | d4 = 1.145 | | |
| r5 = 28.898 | d5 = 2.250 | N3 = 1.84666 | ν3 = 23.78(L3) |
| r6 = −4.413 | d6 = 1.720 | | |
| r7 = ∞(ST) | d7 = 0.100 | | |
| r8 = −30.130 | d8 = 0.800 | N4 = 1.84666 | ν4 = 23.78(L4) |
| r9 = 3.340 | d9 = 2.010 | N5 = 1.62041 | ν5 = 60.34(L5) |
| r10 = −4.217 | d10 = 0.200 | | |
| r11* = 17.864 | d11 = 1.680 | N6 = 1.53048 | ν6 = 55.72(L6) |
| r12* = −3.972 | d12 = 4.151 | | |
| r13 = ∞(IM) | | | |

Aspherical Surface Data of the 3rd Surface (r3)

$\epsilon = 0.10000 \times 10$,
$A4 = 0.19373 \times 10^{-1}$, $A6 = -0.25921 \times 10^{-2}$, $A8 = 0.18990 \times 10^{-3}$,
$A10 = -0.70579 \times 10^{-5}$ Aspherical Surface Data of the 4th (r4)

$\epsilon = 0.10000 \times 10$,
$A4 = 0.16704 \times 10^{-1}$, $A6 = 0.69527 \times 10^{-2}$, $A8 = -0.28377 \times 10^{-2}$,
$A10 = 0.25838 \times 10^{-3}$ TABLE 1-continued <<Example 1>>
f = 1.5, Ψd = 85°, FNO = 2.5

Aspherical Surface Data of the 11th (r11)

$\epsilon = 0.10000 \times 10$,
$A4 = -0.60383 \times 10^{-2}$, $A6 = -0.43704 \times 10^{-4}$, $A8 = 0.34759 \times 10^{-3}$,
$A10 = -0.44709 \times 10^{-4}$ Aspherical Surface Data of the 12th (r12)

$\epsilon = 0.10000 \times 10$,
$A4 = -0.96628 \times 10^{-3}$, $A6 = -0.66101 \times 10^{-3}$, $A8 = 0.42484 \times 10^{-3}$,
$A10 = -0.40257 \times 10^{-4}$

TABLE 2

<<Example 2>>
f = 1.7, Ψd = 88.1°, FNO = 2.5

| Radius of Curvature | Axial Distance | Refractive Index | Abbe Number |
|---|---|---|---|
| r1 = 20.400 | d1 = 1.060 | N1 = 1.77250 | ν1 = 49.62(L1) |
| r2 = 3.340 | d2 = 1.960 | | |
| r3* = −24.582 | d3 = 1.000 | N2 = 1.53048 | ν2 = 55.72(L2) |
| r4* = 2.236 | d4 = 1.000 | | |
| r5 = 8.241 | d5 = 1.440 | N3 = 1.84666 | ν3 = 23.78(L3) |
| r6 = −5.642 | d6 = 1.476 | | |
| r7 = ∞(ST) | d7 = 0.224 | | |
| r8 = −9.057 | d8 = 0.800 | N4 = 1.84666 | ν4 = 23.78(L4) |
| r9 = 3.340 | d9 = 3.070 | N5 = 1.77250 | ν5 = 49.62(L5) |
| r10 = −4.522 | d10 = 0.200 | | |
| r11* = 7.466 | d11 = 1.600 | N6 = 1.53048 | ν6 = 55.72(L6) |
| r12* = −7.918 | d12 = 4.154 | | |
| r13 = ∞(IM) | | | |

Aspherical Surface Data of the 3rd Surface (r3)

$\epsilon = 0.10000 \times 10$,
$A4 = -0.81842 \times 10^{-2}$, $A6 = 0.20407 \times 10^{-2}$, $A8 = -0.19861 \times 10^{-3}$,
$A10 = 0.54067 \times 10^{-5}$ Aspherical Surface Data of the 4th Surface (r4)

$\epsilon = 0.10000 \times 10$,
$A4 = -0.14332 \times 10^{-1}$, $A6 = -0.15020 \times 10^{-3}$, $A8 = 0.11313 \times 10^{-2}$,
$A10 = -0.34019 \times 10^{-3}$ Aspherical Surface Data of the 11th Surface (r11)

$\epsilon = 0.10000 \times 10$,
$A4 = -0.46056 \times 10^{-2}$, $A6 = -0.14933 \times 10^{-4}$, $A8 = 0.81767 \times 10^{-4}$,
$A10 = -0.76283 \times 10^{-5}$ Aspherical Surface Data of the 12th Surface (r12)

$\epsilon = 0.10000 \times 10$,
$A4 = -0.35367 \times 10^{-2}$, $A6 = -0.32491 \times 10^{-4}$, $A8 = 0.11019 \times 10^{-3}$,
$A10 = -0.76144 \times 10^{-5}$

TABLE 3

<<Example 3>>
f = 1.4, Ψd = 85°, FNO = 2.5

| Radius of Curvature | Axial Distance | Refractive Index | Abbe Number |
|---|---|---|---|
| r1 = 17.601 | d1 = 1.000 | N1 = 1.71300 | ν1 = 53.93(L1) |
| r2 = 3.465 | d2 = 2.284 | | |
| r3* = −6.858 | d3 = 1.000 | N2 = 1.49140 | ν2 = 57.82(L2) |
| r4 = 2.236 | d4 = 1.180 | | |
| r5* = 11.319 | d5 = 1.385 | N3 = 1.58340 | ν3 = 30.23(L3) |
| r6 = −4.431 | d6 = 1.071 | | |
| r7 = ∞(ST) | d7 = 0.869 | | |
| r8 = 5.782 | d8 = 1.611 | N4 = 1.50671 | ν4 = 67.78(L4) |
| r9 = −3.000 | d9 = 0.800 | N5 = 1.79850 | ν5 = 22.60(L5) |
| r10 = 12.938 | d10 = 0.400 | | |
| r11* = 7.155 | d11 = 2.140 | N6 = 1.69350 | ν6 = 53.20(L6) |
| r12* = −2.800 | d12 = 4.230 | | |
| r13 = ∞(IM) | | | |

Aspherical Surface Data of the 3rd Surface (r3)

$\epsilon = 0.10000 \times 10$,
A4 = $0.13645 \times 10^{-1}$, A6 = $-0.21275 \times 10^{-2}$, A8 = $0.16427 \times 10^{-3}$,
A10 = $-0.55844 \times 10^{-5}$ Aspherical Surface Data of the 5th Surface (r5)

$\epsilon = 0.10000 \times 10$,
A4 = $-0.49695 \times 10^{-3}$, A6 = $0.17064 \times 10^{-2}$, A8 = $-0.77690 \times 10^{-4}$,
A10 = $0.33483 \times 10^{-4}$ Aspherical Surface Data of the 11th Surface (r11)

$\epsilon = 0.10000 \times 10$,
A4 = $-0.46395 \times 10^{-2}$, A6 = $0.14683 \times 10^{-3}$, A8 = $0.24300 \times 10^{-3}$,
A10 = $-0.20916 \times 10^{-4}$ Aspherical Surface Data of the 12th Surface (r12)

$\epsilon = 0.10000 \times 10$,
A4 = $0.68726 \times 10^{-2}$, A6 = $0.10854 \times 10^{-2}$, A8 = $-0.21681 \times 10^{-3}$,
A10 = $0.46595 \times 10^{-4}$

TABLE 4

<<Example 4>>
f = 1.4, Ψd = 85°, FNO = 2.5

| Radius of Curvature | Axial Distance | Refractive Index | Abbe Number |
|---|---|---|---|
| r1 = 16.479 | d1 = 1.000 | N1 = 1.71300 | ν1 = 53.93(L1) |
| r2 = 3.463 | d2 = 2.154 | | |
| r3* = −7.273 | d3 = 1.000 | N2 = 1.49140 | ν2 = 57.82(L2) |
| r4 = 2.236 | d4 = 1.195 | | |
| r5* = 12.265 | d5 = 2.226 | N3 = 1.58340 | ν3 = 30.23(L3) |
| r6 = −2.686 | d6 = 0.373 | | |
| r7 = ∞(ST) | d7 = 1.159 | | |
| r8 = −5.443 | d8 = 0.800 | N4 = 1.79850 | ν4 = 22.60(L4) |
| r9 = 3.000 | d9 = 1.722 | N5 = 1.75450 | ν5 = 51.57(L5) |
| r10 = −30.734 | d10 = 0.100 | | |
| r11* = 8.144 | d11 = 2.012 | N6 = 1.69350 | ν6 = 53.20(L6) |
| r12* = −3.171 | d12 = 4.234 | | |
| r13 = ∞(IM) | | | |

Aspherical Surface Data of the 3rd Surface (r3)

$\epsilon = 0.10000 \times 10$,
A4 = $0.15346 \times 10^{-1}$, A6 = $-0.22065 \times 10^{-2}$, A8 = $0.19837 \times 10^{-3}$,
A10 = $-0.81701 \times 10^{-5}$

TABLE 4-continued

<<Example 4>>
f = 1.4, Ψd = 85°, FNO = 2.5

Aspherical Surface Data of the 5th Surface (r5)

$\epsilon = 0.10000 \times 10$,
A4 = $-0.12529 \times 10^{-1}$, A6 = $-0.32641 \times 10^{-2}$, A8 = $0.10736 \times 10^{-2}$,
A10 = $-0.43206 \times 10^{-3}$ Aspherical Surface Data of the 11th Surface (r11)

$\epsilon = 0.10000 \times 10$,
A4 = $-0.25548 \times 10^{-2}$, A6 = $0.65468 \times 10^{-4}$, A8 = $0.20341 \times 10^{-3}$,
A10 = $-0.14321 \times 10^{-4}$ Aspherical Surface Data of the 12th Surface (r12)

$\epsilon = 0.10000 \times 10$,
A4 = $0.57464 \times 10^{-2}$, A6 = $0.64674 \times 10^{-3}$, A8 = $-0.11842 \times 10^{-3}$,
A10 = $0.30484 \times 10^{-4}$

TABLE 5

<<Example 5>>
f = 1.4, Ψd = 85°, FNO = 2.5

| Radius of Curvature | Axial Distance | Refractive Index | Abbe Number |
|---|---|---|---|
| r1 = 15.927 | d1 = 1.000 | N1 = 1.71300 | ν1 = 53.93(L1) |
| r2 = 3.418 | d2 = 2.042 | | |
| r3* = −7.193 | d3 = 1.000 | N2 = 1.49140 | ν2 = 57.82(L2) |
| r4* = 2.272 | d4 = 1.316 | | |
| r5 = −140.344 | d5 = 2.936 | N3 = 1.79850 | ν3 = 22.60(L3) |
| r6 = −4.480 | d6 = 0.709 | | |
| r7 = ∞(ST) | d7 = 0.197 | | |
| r8 = 6.573 | d8 = 1.367 | N4 = 1.48861 | ν4 = 70.27(L4) |
| r9 = −3.000 | d9 = 1.000 | N5 = 1.79850 | ν5 = 22.60(L5) |
| r10 = 10.078 | d10 = 0.100 | | |
| r11* = 4.280 | d11 = 2.073 | N6 = 1.49140 | ν6 = 57.82(L6) |
| r12* = −2.153 | d12 = 4.230 | | |
| r13 = ∞(IM) | | | |

Aspherical Surface Data of the 3rd Surface (r3)

$\epsilon = 0.10000 \times 10$,
A4 = $0.23481 \times 10^{-1}$, A6 = $-0.36096 \times 10^{-2}$, A8 = $0.29658 \times 10^{-3}$,
A10 = $-0.11871 \times 10^{-4}$ Aspherical Surface Data of the 4th Surface (r4)

$\epsilon = 0.10000 \times 10$,
A4 = $0.13085 \times 10^{-1}$, A6 = $0.67930 \times 10^{-2}$, A8 = $-0.23488 \times 10^{-2}$ Aspherical Surface Data of the 11th Surface (r11)

$\epsilon = 0.10000 \times 10$,
A4 = $-0.11656 \times 10^{-1}$, A6 = $0.48911 \times 10^{-2}$, A8 = $-0.10743 \times 10^{-3}$,
A10 = $-0.61031 \times 10^{-4}$ Aspherical Surface Data of the 12th Surface (r12)

$\epsilon = 0.10000 \times 10$,
A4 = $0.12559 \times 10^{-1}$, A6 = $0.57921 \times 10^{-2}$, A8 = $-0.15179 \times 10^{-2}$,
A10 = $0.44628 \times 10^{-3}$

TABLE 6

<<Example 6>>
$f = 1.5, \Psi d = 85°, FNO = 2.5$

| Radius of Curvature | Axial Distance | Refractive Index | Abbe Number |
|---|---|---|---|
| r1 = 13.618 | d1 = 1.000 | N1 = 1.77250 | ν1 = 49.62(L1) |
| r2 = 3.411 | d2 = 2.074 | | |
| r3* = −6.406 | d3 = 1.000 | N2 = 1.53048 | ν2 = 55.72(L2) |
| r4* = 2.323 | d4 = 1.220 | | |
| r5 = 39.869 | d5 = 2.470 | N3 = 1.84666 | ν3 = 23.78(L3) |
| r6 = −4.304 | d6 = 1.589 | | |
| r7 = ∞(ST) | d7 = 0.100 | | |
| r8 = −103.929 | d8 = 0.800 | N4 = 1.84666 | ν4 = 23.78(L4) |
| r9 = 3.431 | d9 = 1.820 | N5 = 1.62041 | ν5 = 60.34(L5) |
| r10 = −4.510 | d10 = 0.200 | | |
| r11* = 21.318 | d11 = 1.568 | N6 = 1.53048 | ν6 = 55.72(L6) |
| r12* = −4.182 | d12 = 4.151 | | |
| r13 = ∞(IM) | | | |

Aspherical Surface Data of the 3rd Surface (r3)

$\epsilon = 0.10000 \times 10$,
$A4 = 0.21440 \times 10^{-1}$, $A6 = -0.26951 \times 10^{-2}$, $A8 = 0.17149 \times 10^{-3}$,
$A10 = -0.52285 \times 10^{-5}$ Aspherical Surface Data of the 4th Surface (r4)

$\epsilon = 0.10000 \times 10$,
$A4 = 0.19301 \times 10^{-1}$, $A6 = 0.10062 \times 10^{-1}$, $A8 = -0.28155 \times 10^{-2}$ Aspherical Surface Data of the 11th Surface (r11)

$\epsilon = 0.10000 \times 10$,
$A4 = -0.55466 \times 10^{-2}$, $A6 = 0.23982 \times 10^{-3}$, $A8 = 0.23819 \times 10^{-3}$,
$A10 = -0.37491 \times 10^{-4}$ Aspherical Surface Data of the 12th Surface (r12)

$\epsilon = 0.10000 \times 10$,
$A4 = -0.10693 \times 10^{-2}$, $A6 = -0.83611 \times 10^{-5}$, $A8 = 0.25303 \times 10^{-3}$,
$A10 = -0.30633 \times 10^{-4}$

What is claimed is:

1. A super-wide-angle optical system, for forming an optical image of an object on an image pickup surface of an image sensing device that converts the optical image into an electrical signal, comprising, in order from an object side:

a first negative lens having a meniscus shape convex to the object side;

a second negative lens positioned next to the first negative lens; and a positive lens positioned on an image side with respect to the first and second negative lenses, having an aspherical surface, wherein at least one of four lens surfaces of the first and second negative lenses is an aspherical surface, and wherein the following condition is fulfilled:

$$0.05 < (TL \times Yd)/\{f \times \tan(\Psi d)\} < 3.5$$

where
   $\Psi d$ represents a maximum half field angle,
   Yd represents a maximum image height (mm),
   TL represents a on-axis length (mm) from the lens surface in the closest position to the object and an imaging position, and
   f represents a focal length (mm) of the entire optical system.

2. The super-wide-angle optical system as claimed in claim 1, wherein the following condition is fulfilled:

$$-1.55 < f12/f < -0.7$$

where
   f12 represents a composite focal length (mm) of the first negative lens and the second negative lens.

3. The super-wide-angle optical system as claimed in claim 1, wherein the first or second negative lens having an aspherical surface, and the positive lens having an aspherical surface are constituted by molding plastic materials, and wherein the following condition is fulfilled:

$$-3.0 < fP/fM < -0.5$$

TABLE 7

| | Conditinal Expressions | Example 1 | Example 2 | Example 3 | Example 4 | Example 5 | Example 6 |
|---|---|---|---|---|---|---|---|
| (1) (1a) | $\frac{TL \times Yd}{f \times \tan(\psi d)}$ | 2.512 | 0.840 | 2.658 | 2.617 | 2.684 | 2.542 |
| (2) (2a) | f12/f | −1.130 | −1.034 | −1.196 | −1.214 | −1.260 | −1.100 |
| (3) (3a) | fP/fM | −1.844 | −1.970 | −1.704 | −1.188 | −0.961 | −2.179 |
| (4) (4a) | f1/f2 | 1.628 | 1.393 | 1.883 | 1.889 | 1.860 | 1.991 |
| (5) | Rf/Rr | −4.497 | −0.943 | −2.555 | −2.568 | −1.988 | −5.098 |
| | TL(mm) | 17.986 | 17.984 | 17.970 | 17.974 | 17.970 | 17.991 |
| | Yd(mm) | 2.387 | 2.388 | 2.399 | 2.400 | 2.405 | 2.411 |
| | ψd(°) | 85 | 88.1 | 85 | 85 | 85 | 85 |
| | f(mm) | 1.495 | 1.696 | 1.419 | 1.442 | 1.409 | 1.493 |
| | fP(mm) | 6.293 | 7.515 | 5.641 | 3.996 | 3.261 | 6.734 |
| | fM(mm) | −3.413 | −3.814 | −3.312 | −3.364 | −3.395 | −3.091 |
| | f1(mm) | −5.557 | −5.314 | −6.236 | −6.354 | −6.314 | −6.153 |
| | f2(mm) | −3.413 | −3.814 | −3.312 | −3.364 | −3.395 | −3.091 |
| | f12(mm) | −1.689 | −1.754 | −1.696 | −1.751 | −1.775 | −1.642 | where,
fM represents focal length of the first or second negative lens having the aspherical surface, and
fP represents focal length of the positive lens having the aspherical surface.

4. The super-wide-angle optical system as claimed in claim 1, wherein the second negative lens is a biconcave lens.

5. The super-wide-angle optical system as claimed in claim 4, wherein
the second negative lens has a aspherical surface.

6. The super-wide-angle optical system as claimed in claim 1, wherein a lens in the closest position to the image surface has a positive optical power.

7. The super-wide-angle optical system as claimed in claim 6, wherein the lens in the closest position to the image surface is an aspherical lens.

8. The super-wide-angle optical system as claimed in claim 7, wherein both sides of the lens are aspherical surfaces.

9. The super-wide-angle optical system as claimed in claim 6, wherein the lens in the closest position to the image surface fulfills the following condition:

$$Rf/Rr<-0.8$$

where
Rf represents a radius of curvature (mm) of the object-side surface of the closest lens to the image side, and
Rr represents a radius of curvature (mm) of the image-side surface of the closest lens to the image side.

10. The super-wide-angle optical system as claimed in claim 1, wherein the following condition is fulfilled:

$$0.9<f1/f2<2.5$$

where
f1 represents a focal length of the first negative lens, and
f2 represents a focal length of the second negative lens.

11. The super-wide-angle optical system as claimed in claim 1, wherein the first negative lens is made of glass.

12. The super-wide-angle optical system as claimed in claim 1, wherein the super-wide-angle optical system is composed of, in order from the object side:
the first negative lens; the second negative lens; a third lens; an aperture diaphragm; a fourth lens; a fifth lens; and a sixth lens.

13. The super-wide-angle optical system as claimed in claim 12, wherein the fourth lens and fifth lens are cemented as a composite lens.

14. The super-wide-angle optical system as claimed in claim 13, wherein
the second negative lens is a aspherical plastic lens, an image side surface of the second negative lens being concave,
the third lens is a biconvex lens,
the fourth lens has a negative optical power,
the fifth lens has a positive optical power, and
the sixth lens is biconvex plastic lens having an aspherical surface.

15. The super-wide-angle optical system as claimed in claim 13, wherein
the second negative lens is a aspherical plastic lens, an image side surface of the second negative lens being concave,
the third lens is a positive meniscus lens convex to the image side,
the fourth lens has a positive optical power,
the fifth lens has a negative optical power, and
the sixth lens is a biconvex plastic lens having an aspherical surface.

16. The super-wide-angle optical system as claimed in claim 13, wherein
the second negative lens is a aspherical plastic lens, an image side surface of the second negative lens being concave,
the third lens is a positive plastic lens having an aspherical surface,
the fourth lens has a positive optical power,
the fifth lens has a negative optical power, and
the sixth lens is a biconvex lens having an aspherical surface.

17. The super-wide-angle optical system as claimed in claim 13, wherein
the second negative lens is a aspherical plastic lens, an image side surface of the second negative lens being concave,
the third lens is a positive plastic lens having an aspherical surface,
the fourth lens has a negative optical power,
the fifth lens has a positive optical power, and
the sixth lens is a biconvex lens having an aspherical surface.

18. A super-wide-angle optical system, for forming an optical image of an object on an image pickup surface of an image sensing device that converts the optical image into an electrical signal, comprising, in order from an object side:
a first negative lens having a meniscus shape convex to the object side;
a second negative lens positioned next to the first negative lens; and
at least one positive lens positioned on an image side with respect to the first and second negative lenses, one of positive lenses having a aspherical surface, wherein at least one of four lens surfaces of the first and second negative lenses is an aspherical surface,
and wherein the following condition is fulfilled:

$$0.05<(TL\times Yd)/\{f\times\tan(\Psi d)\}<3.5$$

where
$\Psi d$ represents a maximum half field angle,
Yd represents a maximum image height (mm),
TL represents a on-axis length (mm) from the lens surface in the closest position to the object and an imaging position, and
f represents a focal length (mm) of the entire optical system.

19. An image pickup device comprising:
a super-wide-angle optical system as claimed in claim 1; and
the image sensing device for converting the optical image of the object into an object image data.

20. An image pickup device as claimed in claim 19, further comprising
a recording device for recording the object image data.

21. An image pickup device as claimed in claim 19, further comprising
a display device for displaying the object image data as an object image.

* * * * *